United States Patent [19]

Logsdon et al.

[11] Patent Number: 5,351,289
[45] Date of Patent: Sep. 27, 1994

[54] CALLER ID TELEPHONE SECURITY DEVICE

[76] Inventors: William K. Logsdon, 4003 Northumberland Dr., Louisville, Ky. 40245; Elden E. DuRand, III, 6601 Old Zaring Rd., Crestwood, Ky. 40014

[21] Appl. No.: 946,286

[22] Filed: Sep. 17, 1992

[51] Int. Cl.$^5$ .................. H04M 1/56; H04M 1/64; H04M 1/66
[52] U.S. Cl. ................... 379/142; 379/79; 379/82; 379/199
[58] Field of Search ............ 379/79, 82, 142, 199

[56] References Cited

U.S. PATENT DOCUMENTS

| | | | |
|---|---|---|---|
| 4,582,956 | 4/1986 | Doughty | 379/142 |
| 4,924,496 | 5/1990 | Figa et al. | 379/199 |
| 4,926,470 | 5/1990 | Sanford | 379/199 |
| 4,937,854 | 6/1990 | Sarakas | 379/199 |
| 5,003,595 | 3/1991 | Collins et al. | 379/142 |
| 5,031,205 | 7/1991 | Phillips | 379/199 |
| 5,036,534 | 7/1991 | Gural | 379/82 |
| 5,138,652 | 8/1992 | Hashimoto | 379/79 |
| 5,220,599 | 6/1993 | Sasano et al. | 379/142 |

*Primary Examiner*—Stephen Chin
*Assistant Examiner*—Vijay Shankar

[57] ABSTRACT

Apparatus for automatically controlling the application of the power ring signal of an incoming call generated by the telephone company to a telecommunication device by way of an electronic switching device connected in series with the telephone line. The electronic switching device is controlled by logic circuitry operating in conjunction with circuitry designed to receive and demodulate the caller identification data signal provided by the telephone company during the silent interval between the first and second power ring signals of an incoming call. The logic circuitry maintains the electronic switching device in a nonconductive state, while the telephone company caller identification data received is used to determine whether to continue to suppress the subsequent power ring signals, or allow them to pass to the connected telecommunication device by actuating the electronic switching device to the conducting state. Additionally, provision to interface the logic circuitry to the expansion bus of a computer, thereby applying the greater data processing flexibility of the computer to the processing of the caller identification data and the control of the power ring signal, is taught.

5 Claims, 2 Drawing Sheets

CALLER ID TELEPHONE SECURITY DEVICE

BACKGROUND OF THE INVENTION

This invention relates to telecommunication access security devices, in particular, to devices which intercept the data provided by the telephone company which identifies the calling party, also known as "Caller ID" or "Calling Number Delivery". The Caller Identification Data (CID) signal parameters and protocol relevant to the present invention are described in the technical advisory entitled, "SPCS-to-CPE Data Transmitter Generic Requirements", Bell Communications Research, TA-NWT-000030, Issue Sep. 2, 1991.

In the prior art, there exists several examples of devices which intercept the CID and utilize the caller's telephone number. One prior art example of such a device is disclosed in U.S. Pat. No. 4,924,496 issued to Figa et al. A method and apparatus of the same nature is described in U.S. Pat. No. 4,582,956 issued to Doughty. More recently, devices and methods intended to be used with a personal computer to provide a display of the caller's number and other information on a personal computer console have been employed. For example, U.S. Pat. No. 5,054,055 issued to Hanle et al. The primary purpose of these devices and methods is to forewarn the called telephone subscriber as to the identity of the caller prior to answering the call, so as to allow the subscriber to make a decision as to whether to accept the call or not, or to provide other information regarding the caller prior to answering the call.

A disadvantage of the devices within the prior art that merely receive and display the CID is that they do not provide means for suppressing the power ring signal of an incoming call until after the CID has been received and processed. Since the data is transmitted by the telephone company between the first and second power ring signals, and only as long as the call is not answered, premature answering of the call during the first power ring will prevent the CID from being transmitted. If the call is answered, whether manually by a person, or automatically by a telecommunication device such as a facsimile machine, modem or answering machine, during transmission of the CID, the transient (i.e., burst of noise) that occurs when the telecommunication device goes to the 'offhook' or answer state will interfere with the reception of the data.

Another example of a prior art device by which a caller may be identified, and access to telecommunication devices may be controlled, are those which require the caller to enter access codes via touch tones upon being connected. Prior art examples of this type of device include those disclosed in U.S. Pat. No. 4,937,854 issued to Sarakas and U.S. Pat. No. 4,926,470 issued to Sanford. Disadvantageously, these devices require the cooperation of the caller in order to work, and are easily compromised, i.e., the caller could provide false or stolen information. Another disadvantage of the touch tone access method is that the incoming call is always automatically answered by the device, providing the caller with the opportunity to compromise the security of the system, and requiring that the caller pay for the toll call if such is the case. Another disadvantage of the devices within the prior art is that they do not provide means for selectively passing or blocking the incoming call unattended, based upon the CID provided by the telephone company. Instead, they allow the power ring signal to pass to any telecommunication device which may be connected to the telephone line. The devices of the prior art, therefore, require that a person be present to monitor the caller identification display device in order to make the decision as to whether the call should be accepted or not.

Another disadvantage of the devices within the prior art, particularly those designed to be interfaced to a personal computer, is that they require the use of a limited resource of the computer, to wit, the serial communications interface.

The prior art devices, therefore, have obvious disadvantages and are in fact of little practical usefulness insofar as preventing premature answering of the call to assure reception of the CID, or for providing any reasonable measure of security against unwanted or unauthorized callers to facsimile machines, computers, modems, answering machines, and other telecommunication devices when a person is not present.

SUMMARY OF THE INVENTION

Devices within the scope of the present invention have been effectively utilized to selectively block calls originating from particular telephone numbers, as well as to selectively pass calls originating from particular telephone numbers, automatically and without requiring that a person be present. Furthermore, devices within the scope of the present invention suppress the first power ring signal of an incoming call, thereby preventing the premature answering of a call, and assuring the reception of the CID provided by the telephone company. Telecommunication devices used in conjunction with the present invention will not receive telephone company power ring signals until after the CID has been processed, and an automatic determination has been made whether to pass subsequent power ring signals or not. Moreover, devices within the scope of the present invention never automatically answer incoming calls, or require that the caller enter security codes to gain access to other devices. Instead, the present invention relies solely upon the information transmitted by the telephone company described within the aforementioned technical advisory.

Accordingly, the present invention describes a method and an apparatus which may be a standalone device, intended to be installed between the telephone company central office and the telecommunication devices to be protected, or said apparatus may be an interface adapter equipped with Personal Computer (PC) data bus interface circuitry, intended to be installed within a PC. Said PC interface adapter embodiment of the invention would, therefore, have available to it the greater data storage and retrieval capabilities and data processing power of the PC. In either embodiment, means are provided for connection to the telephone line from the telephone company central office, and additional means for connecting a telecommunication device, whereby said telephone line may be connected to said telecommunication device by way of appropriate electronic switching means.

According to the invention, said electronic switching means is actuated by control logic circuitry operating in conjunction with data reception circuitry, which receives the CID provided by the telephone company. Upon reception of the CID, a determination is made by said control logic circuitry as to whether to allow subsequent power ring signals to pass to the telecommunication device. More particularly, devices within the scope of the present invention provide a means for automatically accepting or rejecting an incoming call based upon the result of a comparison between the received CID and stored reference data provided by a user, by actuating said switching means accordingly. In said PC interface adapter embodiment of the invention, said control logic circuitry may also translate the data provided by the telephone company into a format which may be retrieved by a program operating within the PC. Said program may then determine whether to pass the call or not, and actuate said control logic circuitry accordingly.

No prior art device or method is known by which the power ring signal of an incoming telephone call may be selectively passed or blocked based upon the CID provided by the telephone company. While various arrangements within the scope of the present invention will occur to those skilled in the art upon reading the disclosure set forth hereinafter, examples in accordance with the present invention are as shown in the accompanying Figures.

DETAILED DESCRIPTION OF THE PREFERRED EMBODIMENTS

Figure 1:
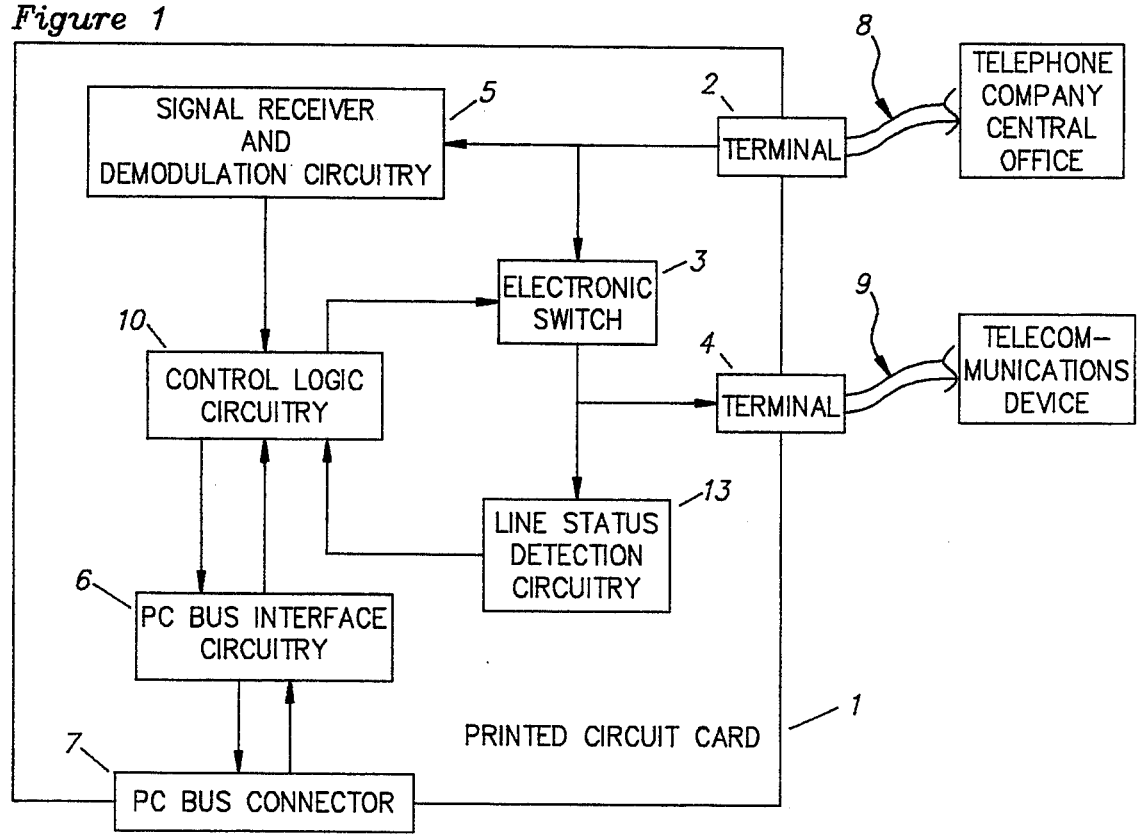
FIG. 1 is a block diagram of one embodiment in accordance with the present invention, including PC data bus interface circuitry.

The Figures are provided to illustrate two possible arrangements within the scope of the present invention. Referring to FIG. 1, Telephone Line 8 is connected to Terminal 2, for example, a standard RJ11 modular telephone jack, which is mounted on Printed Circuit Card 1 along with Telecommunication Device Terminal 4, with Telecommunication Device Cable 9 connected to it. It will be understood that said telecommunication device may take any form, for example, a modem, facsimile machine, answering machine, standard telephone set, etc. Telephone company signals generated by the central office and conveyed via Telephone Line 8 may be passed on to Telecommunication Device cable 9 by way of Electronic Switch 3, for example, a relay. Electronic Switch 3 is normally in the open state, i.e., a high electrical impedance state is maintained between Terminal 2 and Terminal 4 when no call is in progress. Said telephone company signals are also conveyed to Signal Receiver and Demodulation Circuitry 5 from Terminal 2, while Control Logic Circuitry 10 actuates Electronic Switch 3.

Signal Receiver and Demodulation Circuitry 5 is also connected to Control Logic Circuitry 10. Control Logic Circuitry 10 is connected to PC Bus Interface Circuitry 6 which is connected in turn to PC Bus Connector 7. Signal Receiver and Demodulation Circuitry 5 may be comprised of a combination ring signal detection and frequency shift keyed signal demodulator integrated circuit, for example, Motorola part number MC145447, or any of numerous devices and methods, well known in the art, by which frequency shift keyed signals may be demodulated. Line Status Detection Circuitry 13 is connected to terminal 4 and is the means by which Control Logic Circuitry 10 may determine whether a call is in progress. Said line status detection circuitry may be comprised of a full wave bridge rectifier arrangement, whereby said bridge rectifier AC input terminals are connected to Terminal 4, and whereby the DC output of said bridge rectifier is connected to the light emitting diode section of an optical isolation integrated circuit, for example, type number 4N25. The phototransistor output section of said optical isolation integrated circuit may then be monitored by Control Logic Circuitry 10 to determine the state of the telecommunication device connected to Terminal 4, i.e., whether the telecommunication device is in the offhook or onhook state. Control Logic Circuitry 10 may consist of a microprocessor which includes read-only memory (ROM) and random-access memory (RAM). Said microprocessor may also incorporate a program contained within the ROM designed to retrieve, temporarily store and process the demodulated CID provided by Signal Receiver and Demodulation Circuitry 5. Bus Interface Circuitry 6 may be comprised of a combination of standard low power Shottky TTL logic gates, for example, the Texas Instruments 74LS00 series of integrated circuits, or it may be embodied in the form of a Programmable Array Logic integrated circuit.

Signal Receiver and Demodulator Circuitry 5 continually monitors Telephone Line 8 for the various signals provided by the telephone company, more particularly, the power ring signal, and the CID signal. Upon reception of the first power ring signal of an incoming call, Signal Receiver and Demodulator Circuitry 5 triggers Control Logic Circuitry 10, which then monitors Signal Receiver and Demodulator Circuitry 5 for the occurrence of the CID signal, which is in the form of a frequency shift keyed modulated tone transmitted via the telephone line, as described in the aforementioned Bell Communications Research technical advisory. Upon reception of said CID signal, Signal Receiver and Demodulator Circuitry 5 demodulates the data and provides the data in serial format to Control Logic Circuitry 10. Control Logic Circuitry 10 temporarily stores said data, and converts it from a serial format to a parallel format suitable for conveyance to the PC interface bus.

PC Bus Interface Circuitry 6 provides means for allowing a program operating within the PC (not shown) to access Control Logic Circuitry 10 for the purpose of retrieving the stored caller identification information, and to deliver commands from said program to Control Logic Circuitry 10. Bus Interface Circuitry 6 additionally provides means for establishing a unique address by which Control Logic Circuitry 10 may be accessed without conflict with other devices within the computer. Additionally, Bus Interface Circuitry 6 provides bus driver means by which the data stored within Control Logic Circuitry 10 may be applied to the PC bus on demand by said program, and register means by which said program may actuate Control Logic Circuitry 10. Furthermore, Control Logic Circuitry 10 may provide interrupt signal generation means by which said program may be activated via said PC bus.

Upon reception of the CID by Signal Receiver and Demodulator 5, Control Logic Circuitry 10 generates an interrupt signal, thus activating said program, and collects and stores the demodulated CID provided by Signal Receiver and Demodulator 5. Upon activation, said program accesses Control Logic Circuitry 10 by way of Bus Interface Circuitry 6, thereby retrieving said stored CID. Said program then determines, by way of comparing the received CID to stored reference data or other information provided by the user, whether the call shall be passed on to the telecommunication device. Said stored reference data or information may be comprised of a list of preselected caller telephone numbers provided by the user which also contains electronic switch control information for each telephone number in the list. Such control information denotes whether to allow or disallow connection of the telecommunication device to the telephone line by way of Electronic Switch 3 upon reception of a call from a particular number. Moreover, said program may be configured to either allow or disallow connection for unknown numbers (i.e., those not entered on said telephone number list), blocked numbers, or in the absence of caller identification data.

Upon determination by said program as to the appropriate action to perform, a command is then applied to Control Logic Circuitry 10 by way of Bus Interface Circuitry 6, which then actuates Electronic Switch 3 accordingly. For example, should the result of the determination be to connect the telecommunication device to the telephone line, Control Logic Circuitry 10 would actuate Electronic Switch 3 to the closed, or conductive state, thereby allowing power ring signals from the telephone company occurring subsequent to the reception of the CID to pass to the telecommunication device.

Figure 2:
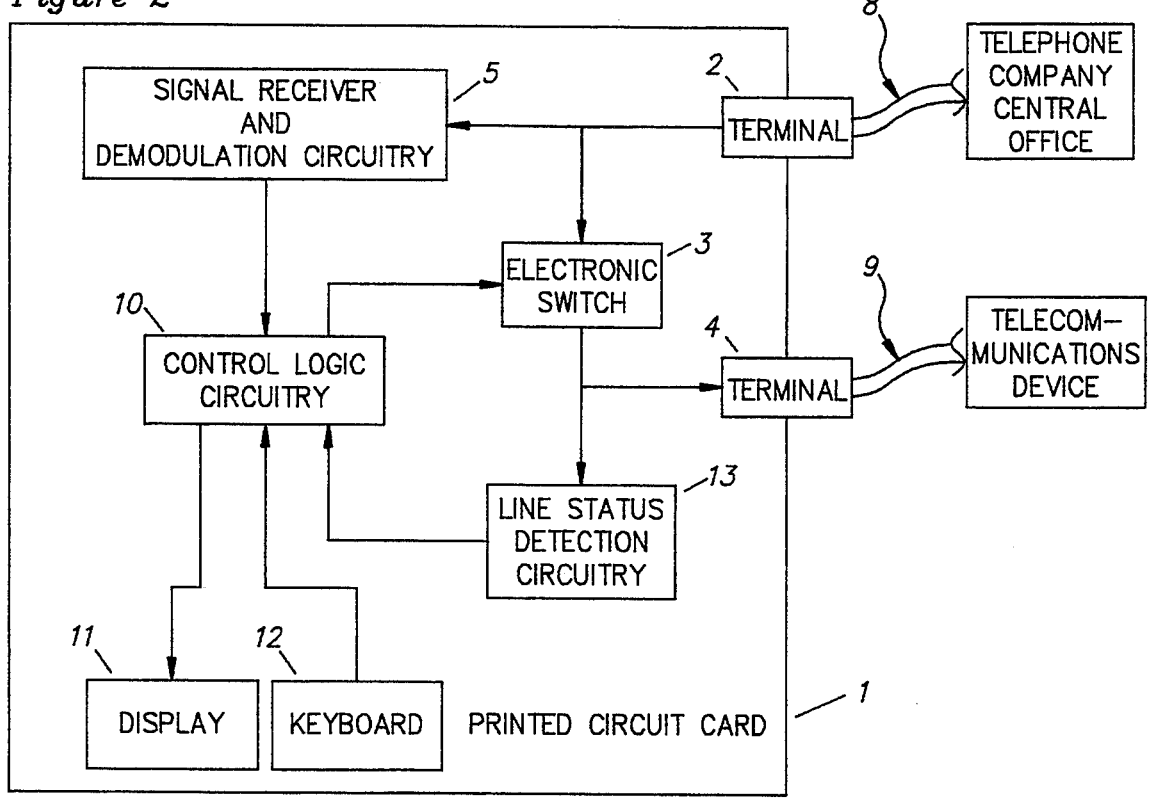
FIG. 2 is a block diagram of an alternative standalone embodiment in accordance with the present invention, including an operator interface comprised of a keyboard and a display device.

Referring now to FIG. 2, an alternative standalone embodiment of the invention is depicted. This embodiment is not intended to be used in conjunction with a PC for its operation. In the figure, all of the major functional aspects of the first described embodiment are included, and are substantially as described hereinbefore, with the exception of PC Bus Interface Circuitry 6 and PC Bus Connector 7 of the first embodiment, which have been eliminated. In the embodiment of FIG. 2, the program performing the comparison of the received CID to stored reference data provided by the user may be contained within Control Logic Circuitry 10, in the form of a combination of read-only and random-access memory. Display Means 11 along with Keyboard Means 12, both connected to Control Logic Circuitry 10, are provided as an operator interface to facilitate entry of preselected telephone numbers and electronic switch control information by the user, and to provide a display of the such information to the user.

It will therefore be appreciated that this method may be used to suppress telephone company power ring signals to various telecommunication devices, to assure reception of the CID signal, and to prevent undesired or unauthorized access to various telecommunication devices by selected calling parties, or to allow access only by selected parties.

It will be further appreciated that there has been provided, in accordance with the invention, a method and apparatus for selective passage or blocking of incoming telephone calls that meets the advantages set forth hereinbefore.

While alternative embodiments will occur to those skilled in the art upon reading this disclosure, it will be understood that the examples presented herein are not intended to limit the spirit and scope of the present invention as set forth in the following claims.

The invention claimed is:

1. Apparatus to selectively pass or block telephone calls by controlling telephone company power ring signals; comprising: electronic switch means having a first terminal means and a second terminal means, whereby electrical continuity between said first terminal means and said second terminal means is controlled, said apparatus including:
    data signal reception and demodulation means for receiving and demodulating frequency shift keyed signals and responsive to telephone company caller identification data transmitted by the telephone company during the silent interval between the first and second power ring signals of an incoming call and conveyed via a telephone line connected to said first terminal means;
    control logic circuitry means responsive to said data signal reception and demodulation means to retrieve and process said telephone company caller identification data, and actuate said electronic switch means;
    means for comparing said telephone company caller identification data with a stored list of preselected caller identification data, wherein each preselected caller identification data item further includes electronic switch control information;
    where said second terminal means is connected to a telecommunication device;
    where said control logic circuitry means maintains said electronic switch means in the non-conductive state to prevent the passage of telephone company power ring signals to said telecommunication device until said telephone company caller identification data is received and processed.

2. Apparatus to selectively pass or block telephone calls by controlling telephone company power ring signals; comprising: electronic switch means having a first terminal means and a second terminal means, whereby electrical continuity between said first terminal means and said second terminal means is controlled, said apparatus including:
    data signal reception and demodulation means for receiving and demodulating frequency shift keyed signals and responsive to telephone company caller identification data transmitted by the telephone company during the silent interval between the first and second power ring signals of an incoming call and conveyed via a telephone line connected to said first terminal means;
    control logic circuitry means responsive to said data signal reception and demodulation means to retrieve and process said telephone company caller identification data, and actuate said electronic switch means:
    bus interface means of a computer whereby a program operating within said computer is responsive to and actuates said control logic circuitry means;
    where said second terminal means is connected to a telecommunication device;
    where said control logic circuitry means maintains said electronic switch means in the non-conductive state to prevent the passage of telephone company power ring signals to said telecommunication device until said telephone company caller identification data is received and processed.

3. The invention of claim 1, including means for displaying said stored list of preselected caller identification data, and further including keyboard means for editing items in said stored list of preselected caller identification data.

4. The invention of claim 1, including line status detection circuitry means responsive to an offhook state of said telecommunication device.

5. The invention of claim 2, including line status detection circuitry means responsive to an offhook state of said telecommunication device.

* * * * *